United States Patent

Stallfort et al.

[11] Patent Number: 6,024,404
[45] Date of Patent: Feb. 15, 2000

[54] CONTROL ASSEMBLY FOR SUNROOFS FOR VEHICLES

[75] Inventors: Klaus Stallfort, Maintal; Rainer Hattass, Gründau; Dieter Federmann, Hanau, all of Germany

[73] Assignee: Meritor Automotive GmbH, Frankfurt, Germany

[21] Appl. No.: 09/104,698

[22] Filed: Jun. 25, 1998

[30] Foreign Application Priority Data

Jun. 30, 1997 [DE] Germany .................. 197 27 738

[51] Int. Cl.[7] .................. B60J 7/057; B60J 7/043; F16C 1/26
[52] U.S. Cl. .................. 296/223; 296/216.04; 49/362; 74/500.5; 74/502.4; 74/504; 74/470
[58] Field of Search .................. 296/223, 216.04, 296/216.08; 49/336, 337, 440, 428, 352, 358, 362; 74/500.5, 470, 490, 502.4, 504

[56] References Cited

U.S. PATENT DOCUMENTS

| | | | |
|---|---|---|---|
| 4,626,023 | 12/1986 | Lutz | 296/214 |
| 4,671,565 | 6/1987 | Grimm et al. | 296/216.04 |
| 4,852,422 | 8/1989 | Mori | 74/502.6 |
| 5,020,850 | 6/1991 | Beinert et al. | 296/223 |
| 5,188,420 | 2/1993 | Maeda et al. | 296/223 |

*Primary Examiner*—D. Glenn Dayoan
*Assistant Examiner*—Patricia Engle
*Attorney, Agent, or Firm*—Howard & Howard

[57] ABSTRACT

A control configuration for a vehicle sunroof panel which is adjustable by means of drive cables, whereby the transmission of jolts and vibrations from the drive elements to the panel and vice versa is damped or prevented by the intermediate elastic damping element between the driver elements engaging with the drive cable and guide shoes controlling the movements of the panel. The elastic damping element preferably is a rubber block that is secured to the driver elements such that vibrations and jolts are at least partially absorbed by the rubber block.

18 Claims, 2 Drawing Sheets

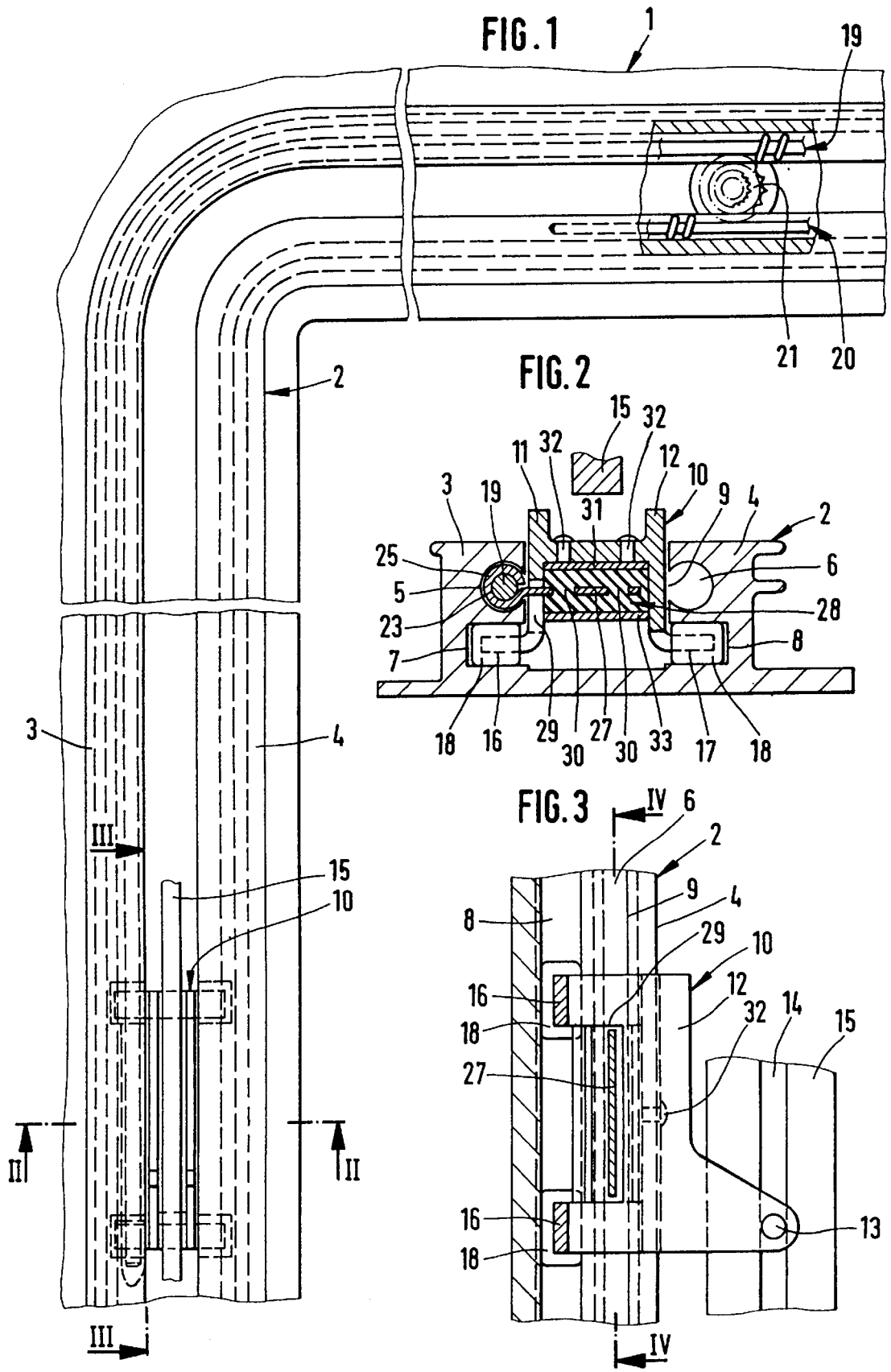

CONTROL ASSEMBLY FOR SUNROOFS FOR VEHICLES

BACKGROUND OF THE INVENTION

The present invention concerns a control configuration for the panel of a vehicle sunroof in which a drive cable which is rigid to pressure and tension is connected via a driver or driver element to the slidable roof panel.

For the purposes of this invention, the term "vehicle sunroof" or "sunroof" shall include not only constructions where the panel, once its rear edge has been lowered to uncover the roof opening, can be slid below the fixed rear roof area, but also "slide-and-lift roofs" where the panel, starting at its closed position, can also be pivoted around a swivelling axis in the vicinity of its front edge so that it is exposed above the fixed roof area.

One known control configuration of the type mentioned at the outset is shown in German Patent Publication No. 34 04 124 A1. In that document, a butt plate is connected, for example using rivets, to the upper side of the driver designated there as a cable clincher. At one end of the butt plate a bearing accepts a pin which engages with a slot of a link of a raising device. When the pin is adjusted along the slot, there follows an adjusting movement of the link either up or down according to the direction of the adjusting movement, and by this means the panel is raised or lowered in the area of its rear edge.

Furthermore, there is a known cable configuration for vehicle sunroofs shown in German Patent Publication No. 32 21 487 A1 whereby a slide mechanism, known there as the rear guide shoe, has attached projections, which allow the slide mechanism to be guided along the cable ducts of a guide rail. A drive cable is mounted with an interference fit to a projection on each side of the panel so that the projection also has the function of a driver for the transmission of cable adjustment movements to the slide mechanism. The slide mechanism or rear guide shoe has a continuous slot-type indentation along its length which is limited on the upper side by two side panels, arranged in fork-type configuration. A bolt is inserted through the side panels, passing through the link slot of a link plate, which engages with the slot-shaped indentation. The link plate is fixed to the clips of a sunroof bracing in such a way as to be height-adjustable.

These known designs have in common the fact that the sliding of the two slide mechanisms, i.e. the rear guide shoes, is aided by drive cables which are driven by a pinion. The pinion is non-rotatably fixed to a drive shaft and meshes with the thread-type wire windings of the cable in the manner of a rack-and-pinion drive. Rotary control of the pinion takes place via a drive device using a hand crank or an electric motor drive. They also have in common the fact that the drive cables are rigidly connected to the slide mechanisms (rear guide shoes) via the drivers and that the transmission of power and motion takes place via pins or bolts in the guide tracks of the links. In turn, the drivers are rigidly connected to the sunroof panel so that there is an overall direct chain of contact of the drive elements from pinion to panel. Only uniform and close meshing between the pinion and the thread-type wire winding of the drive cable can effect even and smooth sliding and/or lifting of the panel.

However, because of production tolerances both in the manufacture of the pinion and in the application of the thread-type wire winding to the cable core assembly, meshing without play is practically impossible. With electric motor drives in particular, where quick-rotating pinions achieve fast panel movements, imprecise meshing can lead to jerky latitudinal cable movements which are directly transmitted to the panel and there, above all when lifting the rear edge of the panel, can cause the panel to vibrate. Similarly, vibrations of the motor armature can be directly transmitted to the sunroof panel. The noise of the motor can also be directly transmitted to the panel via the drive cables and can have a particularly negative effect there as a result of the large resonance surface of the panel. Moreover, investigations have shown that when the drive is not activated a situation can arise where, with imprecise meshing geometry between pinion and drive cable, a section of the wire winding can come to lie between two pinion teeth without direct contact with at least one of the teeth. This means that it is possible that when the pinions are still, minor backward creep of the cable can occur, starting from the panel and transmitted by the drivers to the drive cable. Where the panel is raised, these can, given the flow of air against the panel during the drive or uneven road surfaces, produce vibration of the panel and corresponding noises.

The task of the invention is to provide a control configuration using which faultless, low-noise transmission of power and motion is achieved from the cable drive through to the panel. It is to this end that the present invention has been developed with a view to providing an improved control configuration for the panel of a sunroof.

SUMMARY OF THE INVENTION

The present invention provides a control configuration for the panel of a vehicle sunroof in which a drive cable which is rigid to pressure and tension is connected via a driver means and a sliding member to the slidable roof panel. An elastomeric damping element acts between the driver means and its sliding member so as to dampen out vibrations.

On the one hand, the driver locks positively with and rigidly engages the drive cable but on the other hand, according to the invention, it is connected to the sliding mechanism via a resilient damping element, which means that the direct, rigid chain of contact of the drive elements which together effect the sunroof panel is interrupted, so that, without impairing the control functions, a surprisingly effective reduction in noise is achieved, even with "backward creep" emanating from the panel as described above.

The damping element can take many forms. The only point that must be taken into account is that it must, despite its good damping properties, transmit the required setting force and also withstand the forces which arise when the vehicle is in operation.

The preferred style of damping element is molded from a rubber elastic material in which the driver is partially and permanently embedded. By selecting and molding a suitable rubber elastic material, the damping properties of the damping element can largely be specified according to the required purpose.

A preferred embodiment includes a flat plate on the driver, which enables large surface vulcanization into a rubber block damping element and thus secure attachment of the driver to the damping element. The block form of the damping element guarantees good transmission of the arising forces. The use of rubber, as a damping-intensive material, in conjunction with a driver made of metal allows full use to be made of the very secure on-vulcanization or in-vulcanization attachment which this pairing of materials allows, without the metal surfaces of the drivers and guide shoe coming into direct contact.

In one example embodiment, openings are provided in the flat plate of the driver, through which the rubber material passes during the embedding process. This produces particularly good anchorage of the driver to or in the damping element.

There are various ways of attaching the damping element to the sliding mechanism. For example, the damping element can be fixed in partial positive connection by means of clamping or similar means to a structure of the sliding mechanism allowing the positive connection. The preferred configuration includes the vulcanization technique made possible through the rubber/metal pairing. A metal fixing plate is vulcanized onto the damping element and has means of connection or attachment on its external side which cooperate with corresponding receptacles on the sliding mechanism.

Further details of the invention with reference numbers to the figures illustrating the embodiment, are explained below.

BRIEF DESCRIPTION OF THE DRAWING

FIG. 1 is an abbreviated, diagrammatic top view of the guide frame of a sunroof.

FIG. 2 is a cross-sectional view along line II—II of FIG. 1.

FIG. 3 is a cross-sectional view along line III—III of FIG. 1.

DETAILED DESCRIPTION OF THE PREFERRED EMBODIMENT

Figure 4:
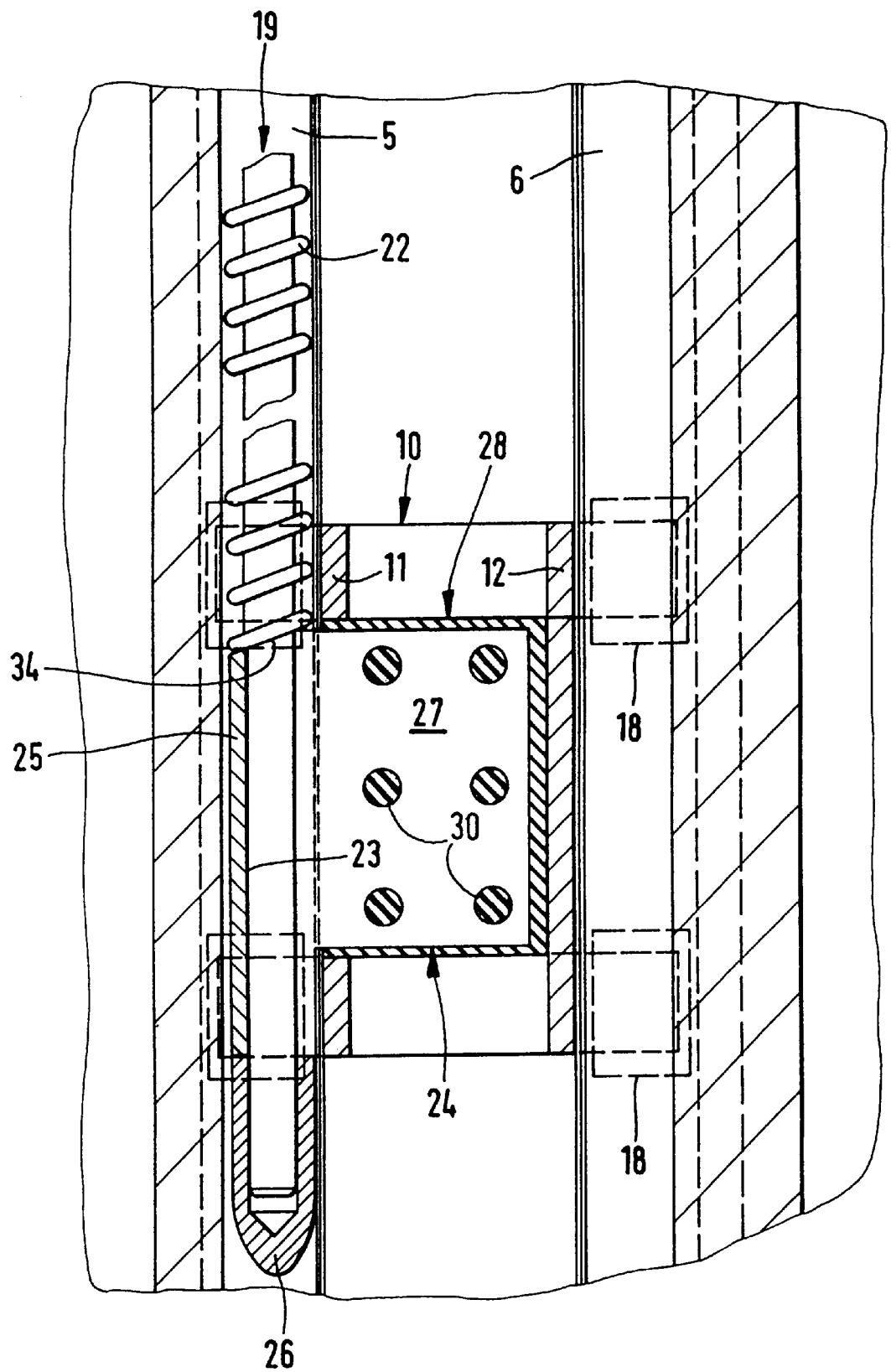
FIG. 4 is a cross-sectional view along line IV—IV of FIG. 3.

In the illustrations several elements which were not necessary to the understanding of the invention and some elements, the design of which is not influenced by the invention, were omitted for the purposes of simplification. For example, the fixed surface of the vehicle roof and the panel of the sliding roof are not shown. FIG. 1 shows only portions of the front part of the frame and the left-hand side of the frame. The righthand side of the frame and the elements meshing with it are approximate mirror images of those illustrated.

The illustrated single-part guide frame 1 shown in the drawings has at least in the side areas which are important for the invention one guide rail 2, which has two spaced, parallel, upward-pointing profile ribs 3 and 4. The surfaces of the profile ribs 3 and 4 which face one another are arranged parallel to one another. Opposite one another at the top of the profile ribs 3 and 4 are cable ducts 5 and 6 (FIGS. 2 and 4) and opposite one another at the bottom of the profile ribs 3 and 4 are guide grooves 7 and 8 (FIG. 2). The cable ducts preferably have corresponding circular cross-sections, each having an aperture 9 facing towards the center of the guide rail.

To guide the sunroof panel, front and rear guide shoes, arranged in pairs, are slid along the guide rail. The illustrations showing only the left-hand rear guide shoe 10. This guide shoe 10, which together with the right-hand rear guide shoe (not shown), forms the sliding mechanism for the panel. The guide shoe 10 essentially has an H-shaped cross-section and has side webs 11 and 12, which run parallel to one another and point upwards (according to FIG. 2) and which essentially serve as receptacle for a bolt 13 (FIG. 3). The bolt 13 engages with the guide slot 14 of a link plate 15, which is also connected (in a manner not illustrated) with the panel of the sunroof, which is also not shown. Where the side webs 11 and 12 point downwards at the lower end, there are extensions 16 and 17 which curve and to which sliders 18 are attached. On each side of the guide shoe 10 there preferably are two sliders 18, which are guided along the guide grooves 7 and 8.

Two flexible drive cables 19 and 20 are guided along the cable ducts 5 and 6 in such a manner as to be rigid to pressure and tension. The drive cables 19 and 20 are driven in opposite directions by a rotatable driving pinion 21 located in the front part of the guide frame 1. One of the drive cables is always connected to one of the rear guide shoes—in the illustration the left rear guide shoe 10 is connected to the drive cable 19 in a manner which shall be described below. The drive cables 19 and 20 have a core to which a thread-type or helical wire winding 22 is firmly attached. The teeth of the driving pinion 21 are in rack-and-pinion-type drive connection with this winding 22.

The following portion of this description will specifically refer only to cable 19, and it is to be understood that the cable 20 is a mirror image of the cable 19. The wire winding 22 is absent from the cable core at the end of the drive cable 19, as shown in particular in FIG. 4. The cable core exposed in this way is inserted through an opening 23 or sleeve portion of a driver 24. The opening 23 preferably is formed by a hollow cylindrical molding 25 in the sheet metal driver 24. The hollow cylindrical molding 25 encloses the core of the drive cable 19 in positive connection. The axial fixing of the driver 24 on the drive cable 19 is achieved on the one hand by means of a lead seal 26, which is positioned at the end of the cable core protruding above the hollow cylindrical molding 25 and attached by crimping, and on the other hand by the positioning of the wire winding 22 at the other side of the hollow cylindrical molding 25. An anti-rotation lock between drive cable 19 and driver 24 preferably is achieved by means of a bevel 34 on the end face of the hollow cylindrical molding 25, with which the last winding of the wire winding 22 is in contact.

The hollow cylindrical molding 25 of the driver 24 preferably has a protrusion that is formed as a flat plate 27. This flat plate 27 passes through the slot 9 of the cable duct 5 and is connected to the rear guide shoe 10 in a manner which shall be described below. An intermediate resilient damping element 28 is also provided.

Furthermore, the flat plate 27 of the driver 24 passes through a window-type opening 29 in the lower area of the side panel 11 of the guide shoe 10. The sides of the window-type opening 29 are not in contact with any side of the flat plate 27, which means that the driver 24 is not in metallic contact with the guide shoe 10. The side web 12 opposite the window-type opening 29 preferably is solid. The righthand guide shoe (which is not illustrated) is a mirror image of the lefthand guide shoe 10.

The resilient damping element 28 preferably is formed from a rubber elastomeric material of suitable hardness. The flat plate 27 embedded in the damping element 28 is attached via vulcanization. To improve the anchorage of the flat plate 27, it is provided with through-openings 30 which are penetrated by the elastomeric material of the damping element 28.

In the illustrated embodiment, the damping element 28 is in block form and is approximately cuboid. A metal fixing plate 31 is vulcanized onto the block-shaped rubber damping element 28, the fixing plate having fastening bolts or studs 32 on its outer side. Below, a metal end cover plate 33 can be vulcanized onto the block-shaped damping element so that the damping element as a whole has a sandwich-type construction with a thick rubber elastic central layer in which the flat plate 27 of the driver 24 is embedded, and an upper and a lower metal plate. The block-shaped damping element 28 is designed so that it is located into the under side of the guide shoe 10, placed centrally between the lower areas of the side webs 11 and 12 and is in contact with the underside (according to the drawings) of the horizontal connecting web between the side webs 11 and 12. Here the fixing plate 31 and, if applicable, the end cover plate 33 of the damping element 28 fix the driver 24 in such a way in the guide shoe 10 that the hollow cylindrical molding 25 of the driver 24 is guided exactly along the cable duct 5.

Since the external dimensions of the flat plate 27 of the driver 24 preferably are smaller than the fixing plate 31 and, if applicable, the end cover plate 33, the flat plate 27 is largely enclosed by the rubber elastic central layer of the damping element and has no metal contact with the guide shoe. Of course the rubber elastic damping element is not surrounded on all sides by panels or plates since the incompressibility of the rubber would produce a rigid, non-elastic connection of the driver to the guide shoe. There are free panel surfaces of the damping element at both end faces, in the area of the window-type opening 29 and also on its lower side, if no end cover plate 33 is present. The end cover plate 33 can, if necessary, also be smaller in width than the fixing plate 31 so that the rubber elastic material of the damping element is not fully covered by the end cover plate 33.

The fastening bolts or studs 32 can, for example, be butt-welded to the fixing plate 31 and are inserted through corresponding bore holes in the guide shoe 10. In the example illustrated, the fastening studs preferably are rivets, but screw or bolts can also be used.

The control configuration according to the invention can also be modelled, without impairing its shock-absorbing or vibration-absorbing effect, in such a way that the metal driver is directly and firmly connected to the metal guide shoe through an intermediate rubber elastic damping element, for example using vulcanization.

The invention provides a control configuration for vehicle sunroofs which is adjustable by means of drive cables, whereby the transmission of jolts and vibrations from the drive elements to the sunroof panel and vice versa is damped or prevented by the intermediate layer of elastic damping elements between the drivers engaging with the drive cable and the guide shoes controlling the movements of the panel.

Although a preferred embodiment of the invention is described, various substitutions and modifications may be made without departing from the scope and spirit of the invention as recited in the appended claims.

We claim:

1. A control assembly for selectively moving a vehicle roof panel relative to a roof opening on a vehicle, comprising:
   a frame;
   a flexible cable supported by said frame for movement relative to said frame;
   a sliding member that is adapted to be connected to the roof panel, said sliding member being supported by said frame for sliding movement relative to said frame;
   a driver member supported by said sliding member for movement with said sliding member, said driver member being attached to a portion of said cable; and
   a generally resilient damping member between said sliding member and said driver member.

2. The assembly of claim 1, wherein said damping member is formed from a resilient elastomeric material and wherein said driver member is at least partially embedded within a portion of said damping member.

3. The assembly of claim 1, wherein said damping member comprises an elastomeric block and wherein said driver member comprises a plate portion that is at least partially embedded within said block.

4. The assembly of claim 3, wherein said driver member includes a sleeve portion that receives a portion of said cable, said sleeve portion extending generally away from one end of said plate portion.

5. The assembly of claim 3, wherein said plate portion includes at least one opening through said plate portion and wherein said elastomeric block includes a portion of elastomeric material extending through said opening.

6. The assembly of claim 1, wherein said damping member and said driver member are connected to each other by vulcanization.

7. The assembly of claim 1, wherein said sliding member includes two sidewalls and a cross portion extending between said side walls and wherein said drive member and said dampening member are received between said side walls such that said drive member does not directly contact said sliding member.

8. The assembly of claim 7, further comprising a rigid securing member attached to said damping member and connected to said cross portion of said sliding member.

9. The assembly of claim 7, wherein said damping member comprises an elastomeric material and wherein said drive member includes a plate portion that is attached to said damping member.

10. The assembly of claim 9, wherein said plate portion is generally encased in said elastomeric material.

11. The assembly of claim 9, wherein said plate portion includes a plurality of openings through said plate portion and wherein said elastomeric material extends through said openings.

12. The assembly of claim 1, wherein said cable is fixedly secured to said driver such that there is no relative axial or rotational movement between said cable and said driver.

13. An assembly for selectively positioning a vehicle exterior panel relative to an opening in a vehicle body portion, comprising:
    a frame;
    a flexible cable supported by said frame for movement relative to said frame;
    a sliding member that is adapted to be connected to the exterior panel, said sliding member being supported by said frame for sliding movement relative to said frame;
    a driver member supported by said sliding member for movement with said sliding member, said driver member being attached to a portion of said cable; and
    a generally resilient damping member secured to said driver member and positioned between said driver member and said sliding member to thereby prevent vibrational movement of said driver member from being transferred to said sliding member.

14. The assembly of claim 13, wherein said damping member comprises a block formed from an elastomeric material.

15. The assembly of claim 14, wherein said driver member includes a plate portion and a sleeve portion that extends from one edge of said plate portion and wherein said plate portion is secured to said elastomeric block and wherein said sleeve portion is fixedly secured to said cable such that there is no relative rotational or axial movement between said cable and said driver member.

16. The assembly of claim 15, wherein said plate portion includes a plurality of openings through said plate portion and wherein said elastomeric material extends through said openings.

17. The assembly of claim 15, wherein said plate portion is embedded within said block of elastomeric material.

18. The assembly of claim 17, further comprising a connector member secured to an outer surface of said block and wherein said connector member is secured to said driver member and wherein said block isolates said driver member from said sliding member.

* * * * *